(12) United States Patent
Neil

(10) Patent No.: US 9,038,180 B2
(45) Date of Patent: May 19, 2015

(54) USING NEW EDGES FOR ANOMALY DETECTION IN COMPUTER NETWORKS

(71) Applicant: Los Alamos National Security, LLC, Los Alamos, MN (US)

(72) Inventor: Joshua Charles Neil, Jemez Springs, MN (US)

(73) Assignee: Los Alamos National Security, LLC, Los Alamos, NM (US)

(*) Notice: Subject to any disclaimer, the term of this patent is extended or adjusted under 35 U.S.C. 154(b) by 0 days.

(21) Appl. No.: 13/826,995

(22) Filed: Mar. 14, 2013

(65) Prior Publication Data

US 2014/0068769 A1 Mar. 6, 2014

Related U.S. Application Data

(60) Provisional application No. 61/614,148, filed on Mar. 22, 2012.

(51) Int. Cl.
H04L 29/06 (2006.01)
G06F 21/57 (2013.01)

(52) U.S. Cl.
CPC ........ H04L 63/1425 (2013.01); H04L 63/1433 (2013.01); *G06F 21/577* (2013.01); *H04L 63/1408* (2013.01)

(58) Field of Classification Search
CPC ..... G06F 21/577; G06F 21/56; G06F 21/566; H04L 63/1425; H04L 63/1433; H04L 63/14; H04L 63/1408; H04L 63/145; H04L 63/1458; H04L 63/1466; H04L 63/1475
USPC .................................................... 726/22–25
See application file for complete search history.

(56) References Cited

U.S. PATENT DOCUMENTS 6,671,811 B1 12/2003 Diep et al.
7,346,803 B2* 3/2008 Ide et al. .................... 714/4.1
(Continued)

FOREIGN PATENT DOCUMENTS

EP 2056559 A1 5/2009

OTHER PUBLICATIONS

"Anomaly Detection in Large Graphs," Akoglu et al., CMU-CS-09-173 Technical Report, School of Computer Science of Carnegie Mellon University, Pittsburgh, http://citeseerx.ist.psu.edu/viewdoc/summary?doi=10.1.1.188.2619 (Nov. 2009).
(Continued)

*Primary Examiner* — Nirav B Patel
(74) *Attorney, Agent, or Firm* — LeonardPatel PC

(57) ABSTRACT

Creation of new edges in a network may be used as an indication of a potential attack on the network. Historical data of a frequency with which nodes in a network create and receive new edges may be analyzed. Baseline models of behavior among the edges in the network may be established based on the analysis of the historical data. A new edge that deviates from a respective baseline model by more than a predetermined threshold during a time window may be detected. The new edge may be flagged as potentially anomalous when the deviation from the respective baseline model is detected. Probabilities for both new and existing edges may be obtained for all edges in a path or other subgraph. The probabilities may then be combined to obtain a score for the path or other subgraph. A threshold may be obtained by calculating an empirical distribution of the scores under historical conditions.

23 Claims, 5 Drawing Sheets

(56) References Cited

U.S. PATENT DOCUMENTS

| | | | |
|---|---|---|---|
| 7,603,711 B2* | 10/2009 | Scheidell | 726/24 |
| 8,397,298 B2* | 3/2013 | Macwan et al. | 726/24 |
| 8,448,247 B2* | 5/2013 | Stute | 726/23 |
| 8,627,473 B2* | 1/2014 | Coskun et al. | 726/23 |
| 8,650,630 B2* | 2/2014 | Choyi et al. | 726/12 |
| 2002/0178383 A1 | 11/2002 | Hrabik et al. | |
| 2003/0105976 A1 | 6/2003 | Copeland | |
| 2004/0133672 A1 | 7/2004 | Bhattacharya et al. | |
| 2005/0044406 A1 | 2/2005 | Stute | |
| 2006/0053136 A1 | 3/2006 | Ashiri | |
| 2006/0253906 A1 | 11/2006 | Rubin et al. | |
| 2007/0209074 A1 | 9/2007 | Coffman | |
| 2007/0226796 A1 | 9/2007 | Gilbert et al. | |
| 2007/0240207 A1 | 10/2007 | Belakhdar et al. | |
| 2009/0024549 A1 | 1/2009 | Johnson | |
| 2009/0320137 A1 | 12/2009 | White et al. | |
| 2010/0192226 A1 | 7/2010 | Noel et al. | |
| 2011/0154119 A1 | 6/2011 | Wang et al. | |
| 2011/0231937 A1 | 9/2011 | Lippmann et al. | |
| 2013/0117849 A1 | 5/2013 | Golshan et al. | |
| 2013/0127618 A1* | 5/2013 | Sheleheda et al. | 340/540 |
| 2013/0318615 A1* | 11/2013 | Christodorescu et al. | 726/25 |

OTHER PUBLICATIONS

"Graph Based Statistical Analysis of Network Traffic," Djidjev et al., Proceedings of the Ninth Workshop on Mining and Learning with Graphs, http://csr.lanl.gov/detection/ (Aug. 2011).

"Scan Statistics for the Online Discovery of Locally Anomalous Subgraphs," PhD Dissertation by Joshua Charles Neil, University of New Mexico, http://repository.unm.edu/handle/1928/13885 (May 2011).

International Search Report issued in PCT Application No. PCT/US13/31402 on Nov. 22, 2013.

International Search Report issued in PCT Application No. PCT/US13/31463 on Jan. 13, 2014.

"Bayesian Anomaly Detection Methods for Social Networks," Nicholas A. Heard, David J. Watson, Kiriaki Platanioti, and David J. Hand, Institute of Mathematical Statistics, The Annals of Applied Statistics, vol. 4, No. 2, pp. 645-662 (2010).

"Graph-Based Anomaly Detection in Computer Network Data," Joshua Neil, SIAM Annual Meeting, Denver, Colorado (Jul. 6-10, 2009).

"GraphScan: Scan Statistics for the Detection of Anomalous Paths in a Graph," Joshua Neil, Curtis Storlie, Curtis Hash, Alexander Brugh, and Michael Fisk, 2010 Joint Statistical Meetings, Vancouver, Canada (Aug. 4, 2010).

"PathScan: Finding the Attacker Within," Joshua Neil, DHS Transition to Practice Demo Day, Washington, DC (Jan. 9, 2013).

"Scan Statistics for the Online Discovery of Anomalous Subgraphs," Joshua Neil, PhD Dissertation Defense at the University of New Mexico (May 3, 2011).

"Scan Statistics on Enron Graphs," Carey E. Priebe, John M. Conroy, David J. Marchette, and Youngser Park, Workshop on Link Analysis, Counterterrorism and Security at the SIAM International Conference on Data Mining, Newport Beach, CA (Apr. 23, 2005).

"The Link-Prediction Problem for Social Networks," David Liben-Nowell, Jon Kleinberg, Journal of the American Society for Information Science and Technology, 58(7), pp. 1019-1031 (May 2007).

"The Science of Cyber Security LDRD Day 2012 Poster," Joshua Neil, LDRD Day 2012, Pojaque, New Mexico (Oct. 23, 2012).

"A Survey of Coordinated Attacks and Collaborative Intrusion Detection," C.V. Zhou, C. Leckie, and S. Karunasekera, Computers & Security,29(1), pp. 124-140 (2010).

"Alert Correlation in a Cooperative Intrusion Detection Framework," F. Cuppens and A. Miege, Proceedings of the 2002 IEEE Symposium on Security and Privacy, pp. 202-215 (2002).

"BotMiner: Clustering Analysis of Network Traffic for Protocol- and Structure-Independent Botnet Detection," Guofei Gu, Roberto Perdisci, Junjie Zhang, and Wenke Lee, Proceedings of the 17th Conference on Security Symposium, SS'08, pp. 139-154, Berkeley, CA (2008).

"Botnets: A Survey," S.S.C. Silva, R.M.P. Silva, R.C.G. Pinto, and R.M. Salles, Computer Networking, http://dx.doi.org/10.1016/j.comnet.2012.07.021 (2012).

"GrIDS-A Graph Based Intrusion Detection System for Large Networks," S. Staniford-Chen, S. Cheung, R. Crawford, M. Dilger, J. Frank, J. Hoagland, K. Levitt, C. Wee, R. Yip, and D. Zerkle, Proceedings of the 19th National Information Systems Security Conference, vol. 1, pp. 361-370, Baltimore, MD (1996).

"Identifying Botnets by Capturing Group Activities in DNS Traffic," Hyunsang Choi and Heejo Lee, Computer Networks, 56(1), pp. 20-33, http://dx.doi.org/10.1016/j.comnet.2011.07.018 (Jan. 2012).

"Probabilistic Alert Correlation," A. Valdes and K. Skinner, Recent Advances in Intrusion Detection, vol. 2212, Lecture Notes in ComputerScience, pp. 54-68, Springer Berlin Heidelberg (2001).

"Scan Statistics for the Online Detection of Locally Anomalous Subgraphs," Joshua Neil, Curtis Storlie, Curtis Hash, Alexander Brugh, Michael Fisk, Advanced Computing Solutions, Statistical Sciences Group (CCS-6), Los Alamos National Laboratory, www.stat.lanl.gov/staff/CurtStorlie/pathscan.pdf (Mar. 26, 2012).

Non-Final Office Action issued in U.S. Appl. No. 13/826,736 on Dec. 24, 2014.

* cited by examiner

USING NEW EDGES FOR ANOMALY DETECTION IN COMPUTER NETWORKS

CROSS REFERENCE TO RELATED APPLICATIONS

This application claims the benefit of U.S. Provisional Application Ser. No. 61/614,148, filed on Mar. 22, 2012. The subject matter of this earlier filed provisional patent application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to edge detection, and, more particularly, to detecting anomalous new edges to identify activity in a computer network that may indicate the presence of an attacker.

BACKGROUND

Conventional anomaly detection approaches generally do not monitor internal network communications, but rather monitor communications that cross the network perimeter. Accordingly, once attackers have penetrated the perimeter, they are not analyzed in a statistical way. Signature-based approaches exist that attempt to match previously known intrusion behavior with observed behavior.

However, signature-based approaches have the disadvantage of being unable to detect new behavior, and almost all attacks are new. Also, conventional approaches generally do not model individual edges. Accordingly, an improved way to detect attackers that models individual edges, and more particularly, the creation of new edges (i.e., communications between a pair of computers that have not communicated in the past), may be beneficial.

SUMMARY

Certain embodiments of the present invention may provide solutions to the problems and needs in the art that have not yet been fully identified, appreciated, or solved by current anomaly detection technologies. For example, some embodiments of the present invention detect anomalous new edges to identify activity in a computer network that may indicate the presence of an attacker.

In one embodiment, a computer-implemented method includes analyzing, by a computing system, historical data of a frequency with which nodes in a network create and receive new edges. The computer-implemented method also includes establishing, by the computing system, baseline models of behavior among the edges in the network based on the analysis of the historical data. The computer-implemented method further includes detecting, by the computing system, a new edge whose appearance is deemed extremely rare, according to a statistical model, such that a probability of observing the new edge is lower than a predetermined threshold during a time window. Additionally, the computer-implemented method includes flagging the new edge, by the computing system, as potentially anomalous when the deviation from the respective baseline model is detected.

In another embodiment, a computer program is embodied on a non-transitory computer-readable medium. The computer program is configured to cause at least one processor to detect creation of an anomalous new edge in a network. The computer program is also configured to cause the at least one processor to flag the new edge as anomalous when creation or receipt of the new edge constitutes atypical behavior by a pair of nodes on either or both ends of communication between the nodes during a given time window based on probability models for a plurality of edges in the network.

In yet another embodiment, a system includes memory storing computer program instructions configured to detect anomalies in a network and a plurality of processing cores configured to execute the stored computer program instructions. The plurality of processing cores is configured to determine whether each edge in a path or other subgraph is a new edge or a previously existing edge. The plurality of processing cores is also configured to calculate a probability for an edge based on a probability of an originating node initiating a new edge and a receiving node receiving the new edge when the edge is new. The plurality of processing cores is further configured to apply a model based on observed behavior to obtain the probability for an edge when the edge previously exists.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

Figure 1:
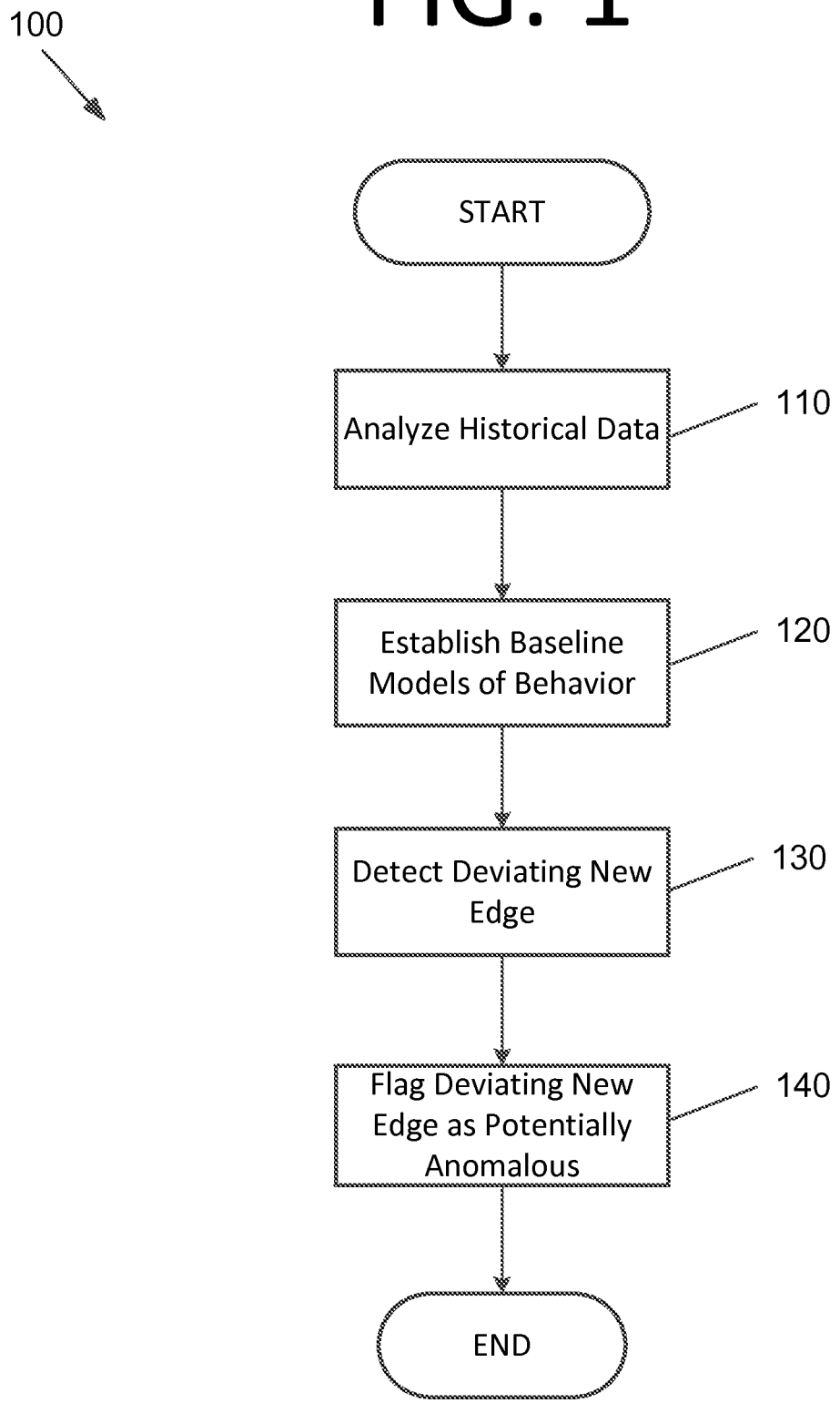
FIG. 1 is a flowchart illustrating a method for detecting anomalous new edges in a network, according to an embodiment of the present invention.

Some embodiments of the present invention pertain to detection of new edges in a network. Detection and use of new edges is previously unknown in the field of attacker detection, and this may be a powerful tool in detecting attackers in networks since new edges may be indicative of attacks. The subject of new edges has been identified with respect to some embodiments of the present invention to be somewhat analogous to social networks, where suggesting "friends" is an important topic. However, some embodiments instead consider the tail of the probability distribution. Thus, instead of finding the most probable new "friends", some embodiments seek the most unlikely new edges between pairs of computers in order to identify anomalies.

First, communications between computers (i.e., edges) that have not communicated in the past (i.e., new edges) can provide a strong statistical signal for detecting attackers. Attackers tend to violate the historical connectivity patterns in the network, and knowledge of these patterns is one of the few advantages that defenders may have over attackers. Accordingly, models for establishing the probability of an observed new edge may be beneficial in attacker detection.

Second, since network behavior tends to change constantly, an online system generally requires the continuous updating of models, and the choice of the applied updating scheme affects false and true alarm rates. Accordingly, an updating scheme based on asymmetric exponentially weighted moving averages ("AEWMAs") may be used to handle continuous updating of the parameters of models in a way that balances acceptable false alarm rates with rapid updating to adjust for changes in baseline behavior.

Per the above, attackers typically do not have a historical understanding of a network's behavior, which gives defenders an advantage in this respect, and new edge detection methods may make use this advantage. Some embodiments detect anomalous behavior indicating hacker presence within a network using a statistical approach with respect to edge behavior. An edge is a sequence of communications between two computers on the network. A new edge is an edge that has not been previously observed in a historical data set.

The historical data set is not analyzed for anomalies in some embodiments. Rather, the historical data may be used to establish a baseline of behavior among the edges in the network. The baseline may be used both to understand how existing edges behave over time and to establish those edges that commonly exist in order to detect new edges in the future. Stated differently, for existing edges, it is possible to associate a model with observed behavior for that edge, and then estimate the parameters of the model given the observed behavior.

New Edges

A more complicated problem is estimating the probability of observing communications between a pair of computers that have not communicated in the past (i.e., a new edge) since there is no existing behavior for the new edge upon which to base an estimation. Instead, information pertaining to the frequency at which the source and destination nodes initiate and receive new edges from other nodes (i.e., computers) in the network may be used. The statistical model for the appearance of new edges may be built such that a sense of "rareness" may be associated with the new edges that are observed. Some computers tend to initiate new edges frequently, while others do so rarely. On the other end of the communication, some computers tend to receive new edges frequently, while others do so rarely. To establish a model that takes this behavior into account, a logistic regression has been developed and tested.

Suppose it is observed that source node x initiates a new edge to destination node y. To establish a probability of observing this edge, a logistic model is proposed:

$$\text{logit}(P_{xy}) = \alpha + \beta_x + \gamma_y \tag{1}$$

where $P_{xy}$ is the probability of the new edge initiated by x and bound for y, $\alpha$ is an effect for the overall rate at which new edges are produced in the network, $\beta_x$ is an effect for how often x initiates new edges, and $\gamma_y$ is an effect for how often y receives new edges.

In some embodiments, new edges are used in the context of path detection described with respect to embodiments in priority U.S. Provisional Patent Application Ser. No. 61/614,148 (hereinafter "the priority application"). Each edge (whether previously existing or not) may receive a p-value. The p-values for each edge in the path are then combined to get a score for the overall path. One way to combine p-values across edges in a path is to use Fisher's scoring method. Let $p_1$, $p_2, \ldots, p_n$ be the p-values to be combined for each edge in the path. The Fisher score $\lambda$ can be found by $$\lambda = \sum_{i=1}^{n} \log(p_i) \tag{2}$$

Other statistical methods can also be used to combine p-values, as would be understood by one of ordinary skill in the art in light of the present disclosure.

In some embodiments, a "new edge detector" may be used without enumerating paths and combining edge scores to get path scores. However, this approach would generally be weaker than using individual edge p-values in a path (or other subgraph) framework. Other subgraphs include, but are not limited to, outstars (see, for example, FIG. 3 of the priority application) and caterpillars (see, for example, FIG. 1C of the priority application). Once a path/subgraph score is obtained (whether for an edge, a path, or any other subgraph), an approach for obtaining a threshold is to calculate an empirical distribution of these scores under historical conditions, and define a threshold such that the system would alarm at a given rate (such as once per day on average, once per week on average, etc.) based on this empirical distribution.

Maximum likelihood estimation of this model is $O(N^2)$, where N is the number of nodes in the network, and no trivially parallel algorithm exists. Instead, method of moments estimation may be used, significantly reducing complexity. To obtain method of moments estimates, a historical data set can be taken and split into two time periods. The first time period may be used to establish the "existing" graph, and the second time period may be used to find new edges that are not in the first time period. The rates may then be estimated according to these new edge frequencies.

For example, the equation $\hat{\alpha} = n/N$ may be used, where n is the number of new edges in a historical data set and N is the total number of edges in the historical data set, giving an estimate for how often new edges arise anywhere in the network. Estimation of $\beta_x$ and $\gamma_y$ may be performed in a similar manner. On large networks, method of moments provides high quality estimation since the sample size will be large. In addition method of moments estimation provides initial estimates, which may then be updated, quickly minimizing the effects of initial estimation error.

Asymmetric Exponentially Weighted Moving Averages ("AEWMAS") for Updating

Some embodiments employ a method for updating the model parameters for each edge in real time or near real time for a large network. For example, an operational system tested with respect to an embodiment of the present invention maintained roughly 1.5 million unique edge models using a single 2U server. As such, a process for updating these models should be lightweight and efficient. In addition, the approach should controls alarm rates such that anomalous behavior, such as new edges appearing, should rapidly become expected in order to avoid inundating security analysts with alarms. Accordingly, some embodiments use AEWMA for this task.

Assume a simple Bernoulli model is used for estimation on each edge. For a given edge E, this provides an estimate p=P(E exists) in the time window t under question. $X_t=0$ is observed if E does not exist in window t, while $X_t=1$ is observed if E does exist in window t. The AEWMA updated estimate may be given by $$p^{new}=[\lambda_1+(1-\lambda_1)p]X_t+(1-\lambda_2)p(1-X_t) \quad (3)$$

where $\lambda_1$ is the AEWMA weight controlling the rate at which the probability increases, and $\lambda_2$ controls the rate at which the probability decreases. This equation may be used to control estimates of normal behavior.

The AEWMA parameters $\lambda_1$ and $\lambda_2$ can be selected according to relative sample size using the rule of thumb equation $$\lambda = \frac{2}{N+1} \quad (4)$$

where N is the number of effective windows. The effect of samples decays exponentially back in time such that all previous samples in time contribute to the AEWMA, but the effective size is the number of previous windows that contribute substantially.

$\lambda_1$ controls the rate at which the parameter increases over time if the edge is observed, while $\lambda_2$ controls the rate of decrease in the parameter when the edge is not observed. For example, $\lambda_1$ can be set so that on average, an edge that is highly anomalous will remain so for ten minutes, and $\lambda_2$ can be set so that non-anomalous edges become anomalous if the edge has not been seen for several weeks or months. In this manner, anomalies quickly become learned, avoiding many successive alarms, and edges take much longer to become anomalous again, also controlling alarm rates. Since the new edge parameter is also a probability of existence, the same formula can be used to update new edge parameters. More complicated models, such as the Observed Markov Model and Hidden Markov Model, require more sophisticated updating, but may also be used.

Accordingly, some embodiments establish the probability of observing an edge between two computers that have never communicated before. In addition, some embodiments employ a lightweight method for updating the parameters of the edge models using AEWMAs to separately control the increase and decrease of parameter values. This limits alarms presented to already overtaxed incident response personnel and enables the updating of millions of models in real time or near real time. Such embodiments tend to perform well in terms of false positive and true positive rates, identifying real attackers without many additional non-attack edges.

FIG. 1 is a flowchart 100 illustrating a method for detecting anomalous new edges in a network, according to an embodiment of the present invention. In some embodiments, the method of FIG. 1 may be implemented, for example, by computing system 500 of FIG. 5. The method begins with analyzing historical data of a frequency with which nodes in a network create and receive edges at 110. Baseline models of behavior are established among the edges in the network based on the analysis of the historical data at 120. A new edge is detected that deviates from a respective baseline model by more than a predetermined threshold during a time window at 130. The new edge is flagged as potentially anomalous when the deviation from the respective baseline model is detected at 140.

Figure 2:
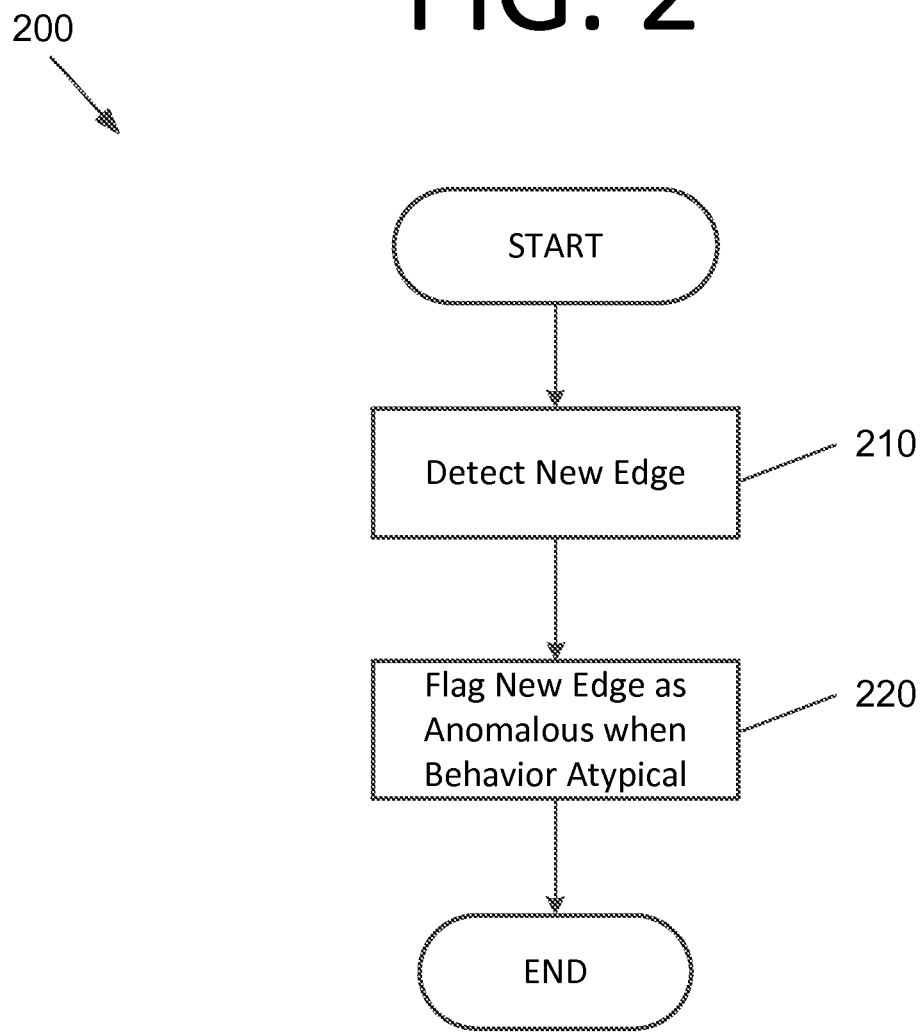
FIG. 2 is a flowchart illustrating another method for detecting anomalous new edges in a network, according to an embodiment of the present invention.

FIG. 2 is a flowchart 200 illustrating another method for detecting anomalous new edges in a network, according to an embodiment of the present invention. In some embodiments, the method of FIG. 2 may be implemented, for example, by computing system 500 of FIG. 5. The method begins with detecting the creation of a new edge in a network at 210. The new edge is flagged as anomalous at 220 when creation or receiving of the new edge constitutes atypical behavior by a node during a given time window based on probability models for a plurality of edges in the network.

Figure 3:
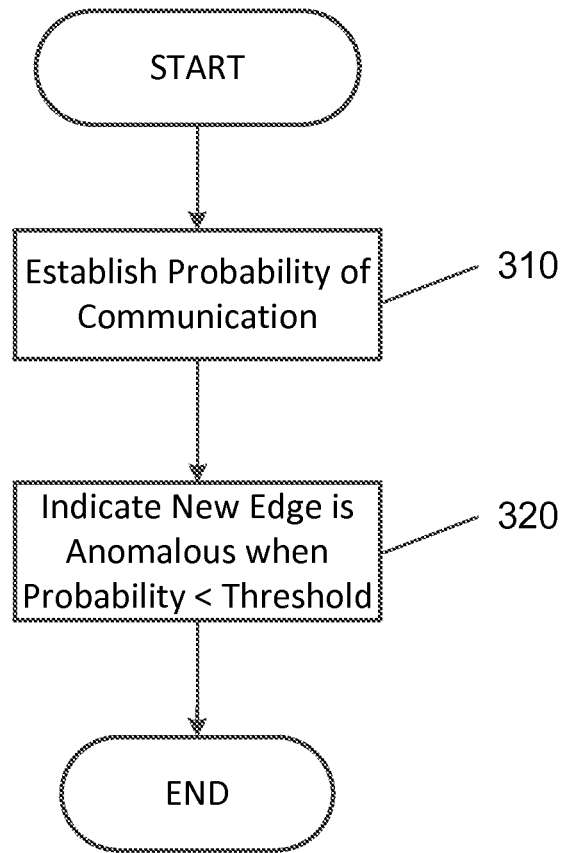
FIG. 3 is a flowchart illustrating yet another method for detecting anomalous new edges in a network, according to an embodiment of the present invention.

FIG. 3 is a flowchart 300 illustrating yet another method for detecting anomalous new edges in a network, according to an embodiment of the present invention. In some embodiments, the method of FIG. 3 may be implemented, for example, by computing system 500 of FIG. 5. The method begins with establishing a probability that a source computer and a destination computer that have not communicated before will communicate based on historical data at 310. An indication that a new edge between the source and destination computer is anomalous is provided when the probability is below a threshold in a given time window at 320.

Figure 4:
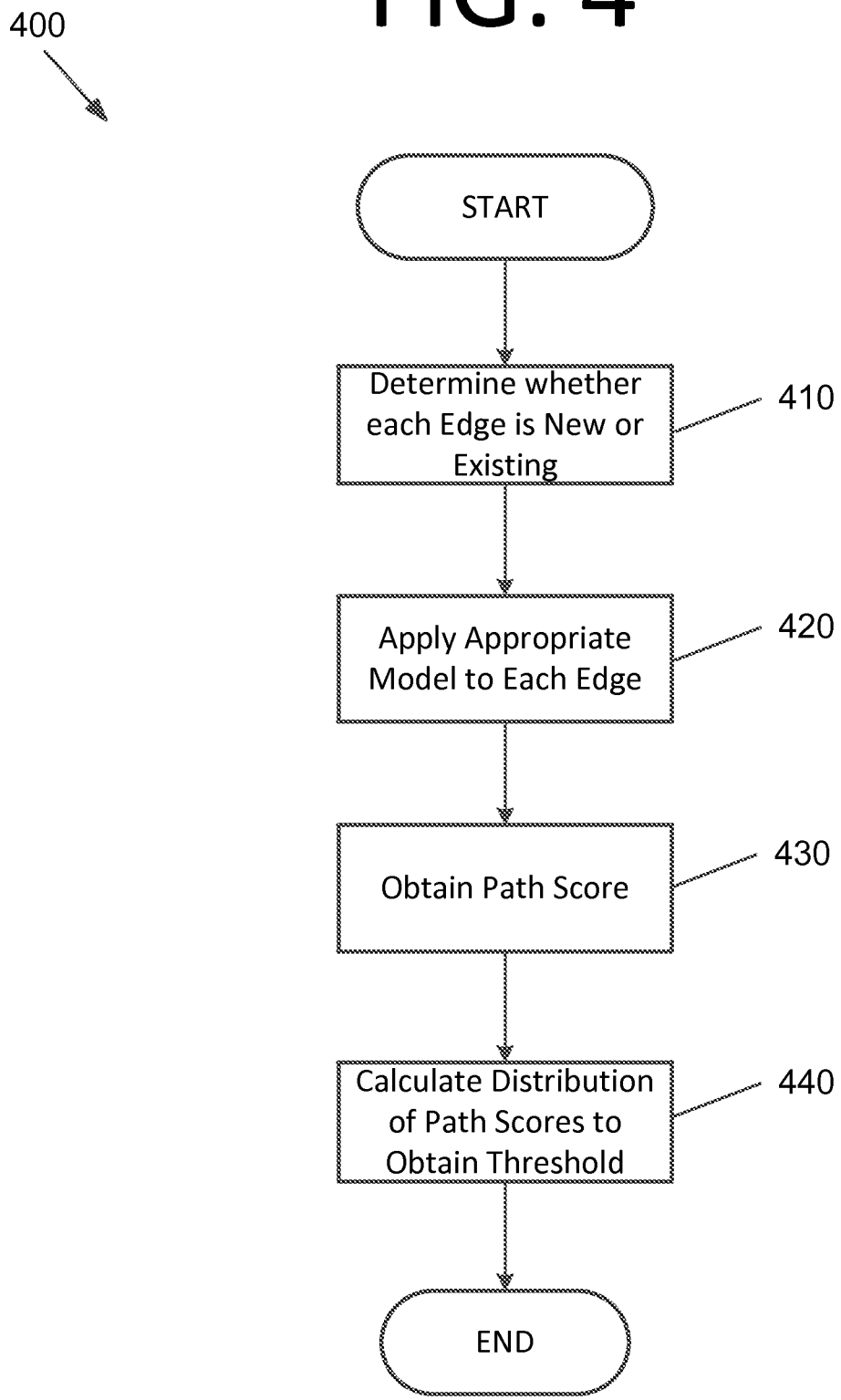
FIG. 4 is a flowchart illustrating a method for scoring new and existing edges and creating a combined path score for a path or any other subgraph, according to an embodiment of the present invention.

FIG. 4 is a flowchart 400 illustrating a method for scoring new and existing edges and creating a combined path score for a path or any other subgraph, according to an embodiment of the present invention. In some embodiments, the method of FIG. 4 may be implemented, for example, by computing system 500 of FIG. 5. The method begins with determining whether each edge in a path or other subgraph is a new edge or a previously existing edge at 410. The appropriate model is then applied to the edge at 420 based on whether the edge is new or previously existing. For new edges, the probability (i.e., p-value) of the edge is calculated based on the probability of the originating node initiating a new edge and the receiving node receiving a new edge. For existing edges, a model based on observed behavior is applied to obtain the p-value. In some embodiments, this model may be that used in some embodiments of the priority application.

The p-values for each edge in the path/subgraph are then combined at 430 to get a score for the overall path/subgraph. Once a path/subgraph score is obtained, a threshold is obtained at 440 by calculating an empirical distribution of these scores under historical conditions, and defining a threshold such that the system would alarm at a given rate (such as once per day on average, once per week on average, etc.) based on the historical data.

Figure 5:
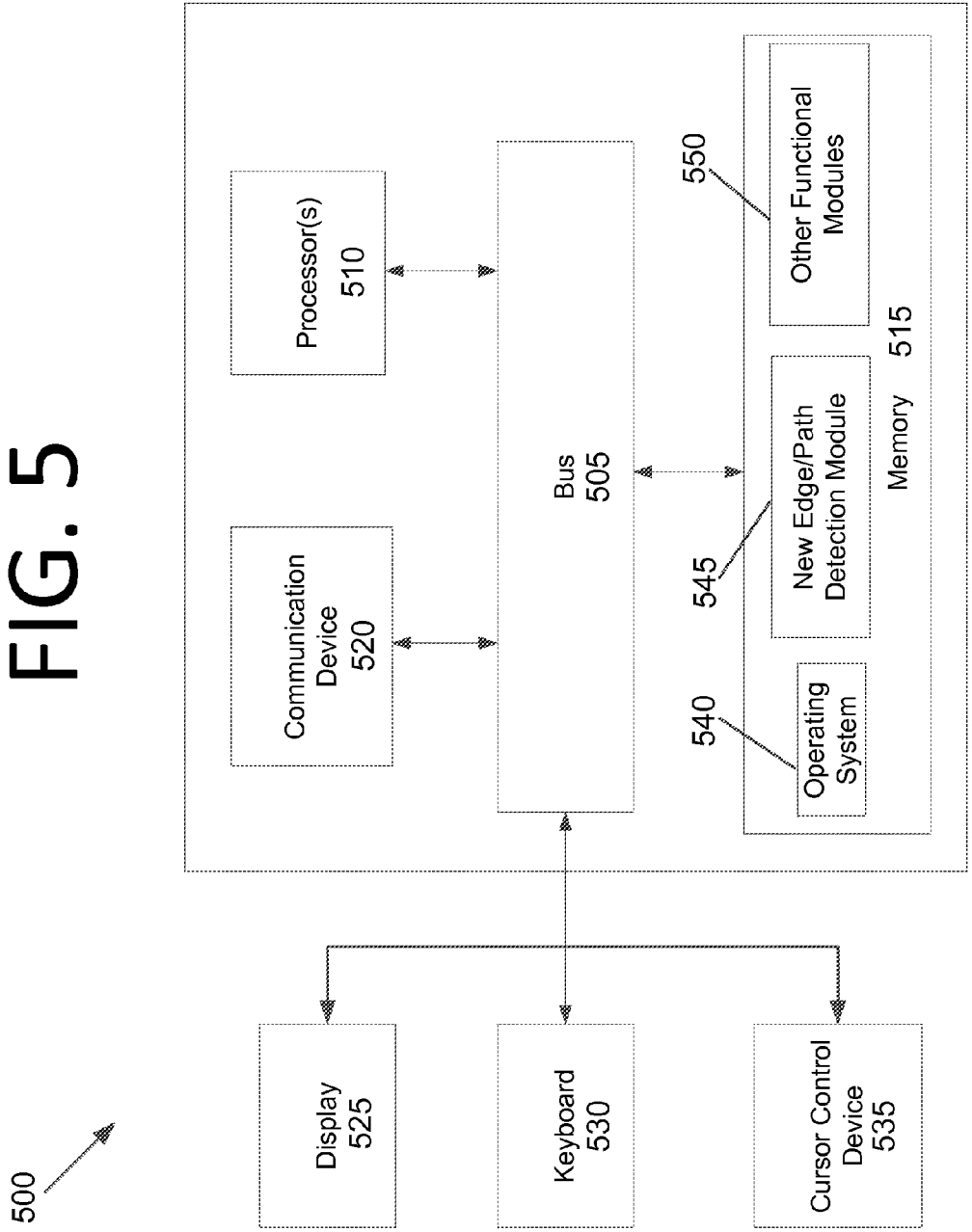
FIG. 5 is a block diagram of a computing system for detecting new edges in a network and/or obtaining scores for paths or other subgraphs containing new and/or existing edges, according to an embodiment of the present invention.

FIG. 5 is a block diagram of a computing system 500 for detecting new edges in a network and/or obtaining scores for paths or other subgraphs containing new and/or existing edges, according to an embodiment of the present invention. Computing system 500 includes a bus 505 or other communication mechanism for communicating information, and processor(s) 510 coupled to bus 505 for processing information. Processor(s) 510 may be any type of general or specific purpose processor, including a central processing unit ("CPU") or application specific integrated circuit ("ASIC"). Processor(s) 510 may also have multiple processing cores, and at least some of the cores may be configured to perform specific functions. Computing system 500 further includes a memory 515 for storing information and instructions to be executed by processor(s) 510. Memory 515 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 500 includes a communication device 520, such as a transceiver, to wirelessly provide access to a communications network.

Non-transitory computer-readable media may be any available media that can be accessed by processor(s) 510 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 510 are further coupled via bus 505 to a display 525, such as a Liquid Crystal Display ("LCD"), for displaying information to a user. A keyboard 530 and a cursor control device 535, such as a computer mouse, are further coupled to bus 505 to enable a user to interface with computing system 500. However, in certain embodiments such as those for mobile computing implementations, a physical keyboard and mouse may not be present, and the user may interact with the device solely through display 525 and/or a touchpad (not shown). Any type and combination of input devices may be used as a matter of design choice.

In one embodiment, memory 515 stores software modules that provide functionality when executed by processor(s) 510. The modules include an operating system 540 for computing system 500. The modules further include a new edge/path detection module 545 that is configured to detect new edges in a network and/or obtain scores for paths or other subgraphs containing new and/or existing edges using one or more embodiments of the present invention. Computing system 500 may include one or more additional functional modules 550 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 1-4 may be performed by a computer program, encoding instructions for the nonlinear adaptive processor to perform at least the methods described in FIGS. 1-4, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 1-4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
analyzing, by a computing system, historical data of a frequency with which nodes create and receive new edges in a computer network;
establishing, by the computing system, baseline models of behavior among the edges in the computer network based on the analysis of the historical data;
detecting, by the computing system, a new edge whose appearance is deemed rare, according to a baseline statistical model, such that a probability of observing the new edge is lower than a predetermined threshold during a time window t; and
flagging the new edge, by the computing system, as potentially anomalous when the deviation from the respective baseline model is detected, wherein
for a given source node x initiating the new edge to destination node y, a probability model of x initiating the new edge in the given time window is given by $$\text{logit}(P_{xy}) = \alpha + \beta_x + \gamma_y$$

where $P_{xy}$ is the probability of the new edge initiated by x and bound for y, $\alpha$ is an effect for an overall rate at which new edges are produced in the computer network, $\beta_x$ is an effect for how often x initiates new edges, and $\gamma_y$ is an effect for how often y receives new edges.

2. The computer-implemented method of claim 1, further comprising:
performing, by the computing system, method of moments estimation on the probability model.

3. The computer-implemented method of claim 1, further comprising:
updating, by the computing system, the baseline models of behavior for each of a plurality of edges E during t using $X_t=0$ when E does not exist in t and $X_t=1$ when E does exist in t; and
determining, by the computing system, an asymmetric exponentially weighted moving average ("AEWMA") for each of the plurality of edges E via $$p^{new} = [\lambda_1 + (1-\lambda_1)p]X_t + (1-\lambda_2)p(1-X_t)$$

where $\lambda_1$ is an AEWMA weight controlling a rate at which a probability for the edge increases, and $\lambda_2$ is an AEWMA weight controlling a rate at which the probability for the edge decreases.

4. The computer-implemented method of claim 3, further comprising:
selecting, by the computing system, the AEWMA parameters $\lambda_1$ and $\lambda_2$ according to relative sample size using $$\lambda = \frac{2}{N+1}$$

where N is a number of effective time windows, and $\lambda_1$ and $\lambda_2$ are selected such that non-anomalous edges become anomalous again when not observed over a period of time.

5. The computer-implemented method of claim 1, further comprising:
determining, by the computing system, whether each edge in a path or other subgraph is a new edge or a previously existing edge;
when an edge is new, calculating, by the computing system, a probability for the edge based on a probability of an originating node initiating a new edge and a receiving node receiving the new edge; and
when an edge previously exists, applying, by the computing system, a model based on observed behavior to obtain the probability for the edge.

6. The computer-implemented method of claim 5, further comprising:
combining, by the computing system, probabilities for each edge in the path or other subgraph to obtain a score for the overall path or other subgraph; and
obtaining a threshold, by the computing system, by calculating an empirical distribution of scores under historical conditions.

7. A computer program embodied on a non-transitory computer-readable medium, the computer program configured to cause at least one processor to:
detect creation of an anomalous new edge in a computer network; and
flag the new edge as anomalous when creation or receipt of the new edge constitutes atypical behavior by a pair of nodes on either end of communication during a given time window t based on probability models for a plurality of edges in the computer network, wherein
for a given source node x initiating the new edge to destination node y, a probability model of x initiating the new edge in the given time window is given by $$\text{logit}(P_{xy}) = \alpha + \beta_x + \gamma_y$$

where $P_{xy}$ is the probability of the new edge initiated by x and bound for y, $\alpha$ is an effect for an overall rate at which new edges are produced in the computer network, $\beta_x$ is an effect for how often x initiates new edges, and $\gamma_y$ is an effect for how often y receives new edges.

8. The computer program of claim 7, wherein the probability models takes into account a frequency at which source and destination nodes make and receive new edges from other nodes.

9. The computer program of claim 7, the program further configured to cause the at least one processor to:
update the probability models of behavior for each of a plurality of edges E during t using $X_t=0$ when E does not exist in t and $X_t=1$ when E does exist in t; and
determine an asymmetric exponentially weighted moving average ("AEWMA") for each of the plurality of edges E via $$p^{new} = [\lambda_1 + (1-\lambda_1)p]X_t + (1-\lambda_2)p(1-X_t)$$

where $\lambda_1$ is an AEWMA weight controlling a rate at which a probability for the edge increases, and $\lambda_2$ is an AEWMA weight controlling a rate at which the probability for the edge decreases.

10. The computer program of claim 9, the program further configured to cause the at least one processor to select the AEWMA parameters $\lambda_1$ and $\lambda_2$ according to relative sample size using $$\lambda = \frac{2}{N+1}$$

where N is a number of effective time windows, and $\lambda_1$ and $\lambda_2$ are selected such that non-anomalous edges become anomalous again when not observed over a period of time.

11. The computer program of claim 7, wherein the program is further configured to cause the at least one processor to:
determine whether each edge in a path or other subgraph is a new edge or a previously existing edge;
calculate a probability for an edge based on a probability of an originating node initiating a new edge and a receiving node receiving the new edge when the edge is new; and
apply a model based on observed behavior to obtain the probability for an edge when the edge previously exists.

12. The computer program of claim 11, the program further configured to cause the at least one processor to:
combine probabilities for each edge in the path or other subgraph to obtain a score for the overall path or other subgraph; and
obtain a threshold by calculating an empirical distribution of scores under historical conditions.

13. A system, comprising:
memory storing computer program instructions configured to detect anomalies in a computer network; and
a plurality of processing cores configured to execute the stored computer program instructions, wherein the plurality of processing cores is configured to:
determine whether each edge in a path or other subgraph is a new edge or a previously existing edge;
calculate a probability for an edge based on a probability of an originating node initiating a new edge and a receiving node receiving the new edge when the edge is new; and
apply a model based on observed behavior to obtain the probability for an edge when the edge previously exists; and
flag the new edge as potentially anomalous when initiating or receiving the new edge constitutes atypical behavior by the originating node or the receiving node during a given time window t based on a probability model for the new edge, wherein
for a given source node x initiating a new edge to destination node y, the probability model of x initiating the new edge in the given time window is given by $\text{logit}(P_{xy}) = \alpha + \beta_x + \gamma_y$ where $P_{xy}$ is the probability of the new edge initiated by x and bound for y, $\alpha$ is an effect for an overall rate at which new edges are produced in the computer network, $\beta_x$ is an effect for how often x initiates new edges, and $\gamma_y$ is an effect for how often y receives new edges.

14. The system of claim 13, wherein the processing cores are further configured to:
establish a probability that a source computer x and a destination computer y that have not communicated before will communicate based on historical data; and
provide an indication that a new edge between x and y is anomalous when the probability is below a threshold in a given time window t.

15. The system of claim 13, wherein the processing cores are further configured to:
update baseline models of behavior for each of a plurality of edges E during t using $X_t=0$ when E does not exist in t and $X_t=1$ when E does exist in t; and
determine an asymmetric exponentially weighted moving average ("AEWMA") for each of the plurality of edges E via $p^{new} = [\lambda_1 + (1-\lambda_1)p]X_t + (1-\lambda_2)p(1-X_t)$ where $\lambda_1$ is an AEWMA weight controlling a rate at which a probability for the edge increases, and $\lambda_2$ is an AEWMA weight controlling a rate at which the probability for the edge decreases.

16. The system of claim 15, wherein the processing cores are further configured to select the AEWMA parameters $\lambda_1$ and $\lambda_2$ according to relative sample size using $$\lambda = \frac{2}{N+1}$$

where N is a number of effective time windows, and $\lambda_1$ and $\lambda_2$ are selected such that non-anomalous edges become anomalous again when not observed over a period of time.

17. The system of claim 13, wherein the processing cores are further configured to:
combine probabilities for each edge in the path or other subgraph to obtain a score for the overall path or other subgraph; and
obtain a threshold by calculating an empirical distribution of scores under historical conditions.

18. A computer-implemented method, comprising:
analyzing, by a computing system, historical data of a frequency with which nodes create and receive new edges in a computer network;
establishing, by the computing system, baseline models of behavior among the edges in the computer network based on the analysis of the historical data;
detecting, by the computing system, a new edge whose appearance is deemed rare, according to a baseline statistical model, such that a probability of observing the new edge is lower than a predetermined threshold during a time window t;
flagging the new edge, by the computing system, as potentially anomalous when the deviation from the respective baseline model is detected;
updating, by the computing system, the baseline models of behavior for each of a plurality of edges E during t using $X_t=0$ when E does not exist in t and $X_t=1$ when E does exist in t; and
determining, by the computing system, an asymmetric exponentially weighted moving average ("AEWMA") for each of the plurality of edges E via $p^{new} = [\lambda_1 + (1-\lambda_1)p]X_t + (1-\lambda_2)p(1-X_t)$ where $\lambda_1$ is an AEWMA weight controlling a rate at which a probability for the edge increases, and $\lambda_2$ is an AEWMA weight controlling a rate at which the probability for the edge decreases.

19. The computer-implemented method of claim 18, further comprising:
selecting, by the computing system, the AEWMA parameters $\lambda_1$ and $\lambda_2$ according to relative sample size using $$\lambda = \frac{2}{N+1}$$

where N is a number of effective time windows, and $\lambda_1$ and $\lambda_2$ are selected such that non-anomalous edges become anomalous again when not observed over a period of time.

20. A computer program embodied on a non-transitory computer-readable medium, the computer program configured to cause at least one processor to:
   detect creation of an anomalous new edge in a computer network;
   flag the new edge as anomalous when creation or receipt of the new edge constitutes atypical behavior by a pair of nodes on either end of communication during a given time window t based on probability models for a plurality of edges in the computer network;
   update the probability models of behavior for each of a plurality of edges E during t using $X_t=0$ when E does not exist in t and $X_t=1$ when E does exist in t; and
   determine an asymmetric exponentially weighted moving average ("AEWMA") for each of the plurality of edges E via $$p^{new}=[\lambda_1+(1-\lambda_1)p]X_t+(1-\lambda_2)p(1-X_t)$$

where $\lambda_1$ is an AEWMA weight controlling a rate at which a probability for the edge increases, and $\lambda_2$ is an AEWMA weight controlling a rate at which the probability for the edge decreases.

21. The computer program of claim 20, the program further configured to cause the at least one processor to select the AEWMA parameters $\lambda_1$ and $\lambda_2$ according to relative sample size using $$\lambda = \frac{2}{N+1}$$

where N is a number of effective time windows, and $\lambda_1$ and $\lambda_2$ are selected such that non-anomalous edges become anomalous again when not observed over a period of time.

22. A system, comprising:
   memory storing computer program instructions configured to detect anomalies in a computer network; and
   a plurality of processing cores configured to execute the stored computer program instructions, wherein the plurality of processing cores is configured to:
      determine whether each edge in a path or other subgraph is a new edge or a previously existing edge;
      calculate a probability for an edge based on a probability of an originating node initiating a new edge and a receiving node receiving the new edge when the edge is new;
      apply a model based on observed behavior to obtain the probability for an edge when the edge previously exists;
      flag the new edge as potentially anomalous when initiating or receiving the new edge constitutes atypical behavior by the originating node or the receiving node during a given time window t based on a probability model for the new edge;
      update baseline models of behavior for each of a plurality of edges E during t using $X_t=0$ when E does not exist in t and $X_t=1$ when E does exist in t; and
      determine an asymmetric exponentially weighted moving average ("AEWMA") for each of the plurality of edges E via $$p^{new}=[\lambda_1+(1-\lambda_1)p]X_t+(1-\lambda_2)p(1-X_t)$$

where $\lambda_1$ is an AEWMA weight controlling a rate at which a probability for the edge increases, and $\lambda_2$ is an AEWMA weight controlling a rate at which the probability for the edge decreases.

23. The system of claim 22, wherein the processing cores are further configured to select the AEWMA parameters $\lambda_1$ and $\lambda_2$ according to relative sample size using $$\lambda = \frac{2}{N+1}$$

where N is a number of effective time windows, and $\lambda_1$ and $\lambda_2$ are selected such that non-anomalous edges become anomalous again when not observed over a period of time.

* * * * *